Patented Oct. 18, 1932                                                              1,882,759

UNITED STATES PATENT OFFICE

EDGAR C. BRITTON AND HAROLD R. SLAGH, OF MIDLAND, MICHIGAN, ASSIGNORS TO THE DOW CHEMICAL COMPANY, OF MIDLAND, MICHIGAN, A CORPORATION OF MICHIGAN

PREPARATION OF SECONDARY ARYL- AND ARALKYLAMINES

No Drawing.        Application filed January 18, 1929. Serial No. 333,514.

The present invention concerns methods for the preparation of secondary arylamines, or aryl-alkylamines, as principal product together with a substantial amount of related aryl or alkyl substituted primary arylamines conjointly, wherein a metallic anilide is reacted with a halogenated aromatic or aliphatic hydrocarbon.

A method for making substituted secondary arylamines is described in British Patent 250,819, wherein nuclear substitution products of diphenylamine are formed "by causing a nuclear halogen substitution product of a benzene hydrocarbon to act on an alkali-metal compound of a primary aromatic amino-body of the benzene series; if desired, in the presence of a catalyst, either one or both of the reacting substances containing at least one nuclear substituent in addition to the halogen atom or amino-group". The temperature disclosed therein as necessary for the aforesaid reaction is 250° to 300° C.

We have now devised certain useful improvements whereby more advantageous operating conditions are provided, high yields of principal products may be attained and a wider range of compounds of the character in hand may be prepared. To the accomplishment of the foregoing and related ends, the invention, then, consists of the steps hereinafter fully described and particularly pointed out in the claims, the following description setting forth detail procedures embodying the invention, these being illustrative however of but several of the ways in which the principle of our invention may be used.

The present invention involves important distinctions over the aforementioned method, and more particularly in accordance herewith—

(1) The reaction may be caused to proceed at temperatures materially lower than those stated in the aforesaid patent, and indeed, at a temperature as low as 110° C.:

(2) It is not essential that either of the reacting substances shall contain a nuclear substituent in addition to the halogen or amino-group; for example, diphenylamine itself can be produced equally as well as nuclear substituted derivatives thereof:

(3) Other metallic derivatives of a primary aromatic amine may be employed as well as the alkali-metal derivatives thereof; for example, the corresponding calcium, aluminum or magnesium anilides:

(4) It is not essential that a halogen substituted benzene or other aromatic hydrocarbon be employed to react upon the metallic anilide, and the reaction takes place equally well with alkyl halides:

(5) The reaction product contains a measurable amount of aryl- or alkyl-substituted primary arylamine corresponding to and accompanying the principal secondary amine product; in general the higher the temperature the greater the amount of such primary amine is formed.

The present invention, therefore, comprehends a method for the preparation of secondary arylamines or aryl-alkylamines and nuclear substituted derivatives thereof, together with a greater or lesser amount of the corresponding aryl- or alkyl-substituted primary amine. The reactions involved may be illustrated by the following equations leading in the formation of diphenylamine and amine-diphenyl, viz:—

(1) 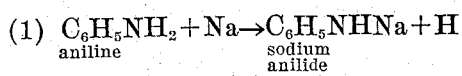
$$\underset{\text{aniline}}{C_6H_5NH_2} + Na \rightarrow \underset{\text{sodium anilide}}{C_6H_5NHNa} + H$$

(2) 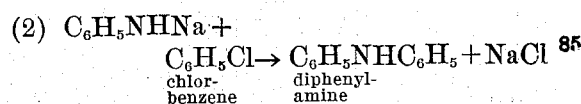
$$C_6H_5NHNa + \underset{\text{chlorbenzene}}{C_6H_5Cl} \rightarrow \underset{\text{diphenylamine}}{C_6H_5NHC_6H_5} + NaCl$$

(3) 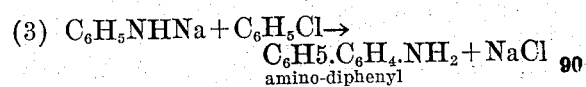
$$C_6H_5NHNa + C_6H_5Cl \rightarrow \underset{\text{amino-diphenyl}}{C_6H_5.C_6H_4.NH_2} + NaCl$$

The principal reaction between the metallic anilide and chlor-benzene leading to the formation of a secondary amine is represented by Equation (2), while Equation (3) represents the subsidiary reaction leading to the formation of a nuclear substituted primary arylamine, which, nevertheless, can amount to from 10 to 50 per cent. of the reaction product, depending upon the conditions of operation. The simultaneous formation of the two isomeric compounds, diphenylamine and amino-diphenyl, may possibly be due to the existence of tautomeric forms of the metallic anilide, as shown by the formulæ, viz:

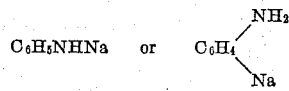

$C_6H_5NHNa$    or    $C_6H_4\!\!<\!\!{}^{NH_2}_{Na}$

The invention, however, is independent of any theory that may be postulated in explanation of the observed facts.

The present method, of course, is not limited to the specific compounds given as an illustration in the foregoing equations. In Equation (1) primary aromatic amines generally, or the nuclear substitution products thereof, may be substituted for aniline, while other metals of Groups I, II and III as, for example, potassium, calcium, magnesium or aluminum may be used instead of sodium. In Equations (2) and (3) other mono- or polyhalogenated aromatic hydrocarbons or alkyl halides may replace chlorbenzene, or substituted derivatives of such halogenated hydrocarbons, as for example, chlor-phenols and ethers thereof, chlor-carboxylic or sulphonic acids, etc. When such phenols or acids are employed for the reaction they should be introduced in the form of their alkali-metal salts.

The relative preponderance of Equation (2) as opposed to Equation (3) is determined largely by the reaction temperature, and to a lesser extent by the specific metal employed to form the metallic anilide as in Equation (1). Suitable reaction temperatures are found in the range between 100° and 250° C., or higher. In general, brom-substituted compounds react at somewhat lower temperatures than the corresponding chlor-compounds. With any given combination of reactants and within the range of temperatures at which a substantial conversion is realized, the lower temperatures within such range will favor the reaction as represented by Equation (2), while increasing the temperature tends to promote the reaction represented by Equation (3).

As a rule pressure is not essential for consummating the reaction, but at times may be advantageously employed in case the preferred reaction temperature is above the boiling point of one of the reactants. In such case, however, a reflux condenser can often be employed with equal advantage, the condensed vapors being continuously returned to the reaction. A solvent for the reaction constituents may be advisedly employed, which may consist of an excess of one of the reactants, or of some additional non-reactive solvent, or of a mixture of same. Another function of such solvent at times may be to serve as a temperature modifying liquid for regulating the boiling point of the reaction mixture.

By way of illustration the following detailed examples are given, but it is understood that such examples are not to be considered as a limitation upon the invention.

*Example 1.*—325 grams dry aniline and 23 grams sodium with a trace of cuprous oxide were heated to a temperature of about 170° to 180° C., heating being continued for approximately 3 hours or until evolution of hydrogen ceased. The temperature of the mixture was then allowed to fall to about 150° C. and 115 grams chlorbenzene were run in drop by drop during about 1 hour, and the mixture maintained at a temperature of 150° to 160° for 7 hours longer. As the reaction proceeded sodium chloride crystals were precipitated. The reaction mixture was then cooled and treated with water to dissolve the salt and the oil layer separated from the aqueous salt solution. The oil layer was fractionally distilled under reduced pressure, the products obtained being unreacted chlorbenzene, excess aniline and finally a mixture of diphenylamine and amino-diphenyl, a small amount of tarry residue remaining in the still. The mixture of diphenylamine and amino-diphenyl was treated with dilute hydrochloric acid, which dissolved amino-diphenyl, leaving diphenylamine as pure white crystals which were filtered from the solution. The acid solution was then neutralized with caustic soda solution to precipitate amino-diphenyl crystals which were filtered off. The product consisted of 88 grams diphenylamine and 13 grams amino-diphenyl. Titration of the aqueous salt solution for chlorides indicated a 75.2 per cent. conversion based upon the quantity of sodium used, in accordance with the Equations (1), (2) and (3) above, the balance of the original charge being recovered as unreacted aniline and chlorbenzene. The yield of product was 59.7 per cent. based upon the raw materials taken, or 79 per cent. based upon the chlorbenzene actually reacted and consumed.

In the foregoing example an excess of aniline was employed as solvent for the reaction. Another solvent, as toluene, diphenyl oxide or the like, may be used if desired, but aniline is satisfactory for the purpose and is readily separated and recovered from the reaction product. If brombenzene is used in the reaction instead of chlorbenzene, the reaction temperature is reduced to about 110° C. In working up the product by treating with hydrochloric acid solution, the primary amine constituent dissolves therein with salt formation, whereas the weakly basic secondary amine does not react with the dilute acid and remains undissolved. This procedure is of general application for separating the products obtained by my improved method.

*Example 2.*—650 grams dry aniline and 30 grams sodium, with a small amount of cuprous oxide, were heated together in an iron autoclave at a temperature of 175° to 180° C. for 3 hours, the hydrogen formed being released at a pressure of about 60 pounds. 150 grams chlorbenzene was then added and the mixture heated to 200° C. under pressure for 13½ hours. The reaction product was worked up as in Example 1. There were obtained 106 grams diphenylamine and 58 grams amino-diphenyl. Chlorine titration showed 90.6 per cent. conversion of chlorbenzene. The yield of product was 75 per cent. of theory, or 81.7 per cent. based upon consumption of chlorbenzene.

*Example 3.*—Sodium anilide was formed by heating 130 grams dry aniline, 10 grams sodium with a trace of cuprous oxide for 3½ hours at 170° to 180° C. The mixture was transferred to an iron bomb, 55 grams chlorbenzene added, and the whole heated under pressure at 250° to 300° C. for 25 minutes. From the product were obtained 40 grams diphenylamine and 16 grams amino-diphenyl. Conversion of chlorbenzene as shown by chloride titration was 90 per cent; yield of product 76.3 per cent. of theory, or 83.6 per cent. of material actually consumed.

*Example 4.*—In similar manner, sodium anilide and para-chlortoluene heated together at 175° to 180° C. for 5 hours gave a 74.3 per cent. yield of product consisting of 75 per cent. phenyl-tolyl amine and 25 per cent. amino-methyl-diphenyl. Based upon material actually consumed the total yield was 80 per cent.

*Example 5.*—Sodium anilide and α-chlornaphthalene heated together for 5 hours at 170° to 180° C. gave a 64.5 per cent. yield of product consisting of 80 per cent. phenyl-α-naphthylamine and 20 per cent. aminophenyl-naphthyl. The yield based upon materials actually consumed was 68 per cent.

*Example 6.*—325 grams dry aniline and 9 grams potassium, with a trace of cuprous oxide, were heated at 110° to 115° C. for 1 hour. Then 28 grams chlorbenzene was added and the mixture heated at 170° to 175° C. for 6 hours. The yield was 56.4 per cent. of a product consisting of 85.6 per cent. diphenylamine and 14.4 per cent. amino diphenyl. Based upon materials actually consumed the yield was 83 per cent.

*Example 7.*—200 grams of dry aniline and 5 grams aluminum, with a trace of cuprous oxide, were heated at 180° C. for 16 hours. Then 63 grams chlorbenzene were added and the mixture heated at 180° C. for 7 hours. The yield was 40 per cent. and conversion of chlorbenzene 48 per cent, corresponding to an 83 per cent. yield based upon materials actually consumed. The product consisted of 79 per cent. diphenylamine and 21 per cent. amino-diphenyl.

*Example 8.*—350 grams aniline and 10 grams magnesium powder, with a trace of cuprous oxide, were heated at 180° C. for 6 hours. Then 100 grams chlorbenzene were added, and the mixture heated at 180° C. for 8 hours. The yield was 51 per cent. and conversion of chlorbenzene 58.5 per cent., corresponding to an 87 per cent. yield based upon materials actually consumed. The product consisted of 78 per cent. diphenylamine and 22 per cent. amino-diphenyl.

*Example 9.*—200 grams aniline and 11½ grams sodium, with a trace of cuprous oxide, were heated at 180° C. for 3 hours. 68 grams normal butyl bromide were then added, and the mixture heated at 150° C. for 3½ hours. The yield was 77 per cent. of a product containing 93.1 per cent. n-butyl aniline and 6.9 per cent. amino-butyl-benzene.

In the foregoing examples various specific applications of the principle of our invention have been described with reference to derivatives of aniline formed by reaction of a metallic anilide with a mono-halogenated aromatic or aliphatic hydrocarbon, irrespective of the presence of a substituent in addition to the halogen or amino-group in the aromatic nucleus of one or other of the reacting substances. It is seen from Examples 1, 2 and 3 that the ratio of secondary amine to substituted primary amine in the reaction product is higher at the lower reaction temperatures, and that as the temperature is increased the proportion of substituted primary amine in the product likewise increases. In Example 3 the production of diphenylamine itself in good yield, together with some amino-diphenyl, is shown under conditions whereby only nuclear substitution products thereof had been previously found possible of formation. In further examples the preparation of derivatives of other halogenated aromatic hydrocarbons than chlorbenzene is illustrated as well as similar derivatives of an aliphatic halide, and likewise the procedure for utilizing other metallic anilides derived from metals of Groups I, II and III.

It is understood that similar derivatives of primary aromatic amines generally may be prepared in analogous fashion by reacting between the corresponding metallic anilide or homologous arylamide and a halogenated aromatic or aliphatic hydrocarbon. Still further, compounds of related constitution may be formed by reacting between a suitable metallic arylamide and a poly-halogenated aromatic or aliphatic hydrocarbon, as for example ethylene dichloride, dichlorbenzene, dichlornaphthalene, and the like. By suitable manipulation and properly proportioning the relative quantities of reactants employed either one or more of the halogen atoms of the poly-halogenated hydrocarbon may be caused to react. Thus a stepwise operation is feasible, yielding first halogen substituted amino compounds, and finally a completely dehalogenated product. If desired the reaction may be controlled to produce said halogen substituted compounds as end products.

In preparing the metallic anilide or arylamide the use of a catalyst, such as cuprous oxide, facilitates the reaction, but such use of a catalyst is not essential to the invention.

Other modes of applying the principle of our invention may be employed instead of the one explained, change being made as regards the detail herein disclosed, provided the step or steps stated by any of the following claims or the equivalent of such stated step or steps be employed.

In the claims the term "metallic anilide" comprehends broadly any compound of the general formula Aryl.NH.Met formed by reacting a primary arylamine with one molecular equivalent of a metal reactive therewith.

We therefore particularly point out and distinctly claim as our invention:—

1. The method of making conjointly a secondary arylamine having the general formula Aryl.NH.R and the corresponding primary arylamine having the general formula R.Aryl.NH$_2$, wherein R represents an aryl or alkyl group, which comprises reacting a metallic anilide of a metal from the group consisting of Na, K, Ca, Mg and Al, with a halogenated hydrocarbon having the general formula R.Hal, wherein R is aryl or alkyl, at a temperature between 100° and 250° C.

2. The method of making conjointly a secondary arylamine having the general formula Aryl.NH.R and the corresponding primary arylamine having the general formula R.Aryl.NH$_2$, wherein R represents an aryl or alkyl group, which comprises reacting aniline with not more than one molecular equivalent of a metal from the group consisting of Na, K, Ca, Mg and Al, to form the corresponding metallic anilide, adding a halogenated hydrocarbon having the general formula R.Hal, wherein R is alkyl or aryl, and heating at a temperature between 100° and 250° C.

3. The method of making a secondary aralkyl amine and the corresponding nuclear alkyl-substituted primary arylamine which comprises reacting aniline with not more than one molecular equivalent of a metal from the group consisting of Na, K, Ca, Mg and Al, to form the corresponding metallic anilide, adding an alkyl halide and heating at a temperature between 100° and 250° C.

4. The method of making a diarylamine and the corresponding nuclear aryl-substituted primary arylamine which comprises reacting aniline with not more than one molecular equivalent of a metal from the group consisting of Na, K, Ca, Mg and Al, to form the corresponding metallic anilide, adding a monohalogenated aromatic hydrocarbon and heating at a temperature between 100° and 250° C.

5. The method of making diphenylamine and amino-diphenyl which comprises reacting aniline with not more than one molecular equivalent of a metal from the group consisting of Na, K, Ca, Mg and Al, to form the corresponding metallic anilide, adding chlorobenzene and heating at a temperature between 100° and 250° C.

6. The method of making diphenylamine and amino-diphenyl which comprises heating aniline with not more than one molecular equivalent of sodium, adding chlorobenzene to the resulting product and heating at a temperature between 100° and 250° C.

7. In a method of making a diarylamine and the corresponding amino-diaryl, the step which consists in reacting a metallic anilide of the formula $C_6H_5$.NH.Met wherein Met represents Na, K, Ca, Mg or Al, with a monohalogenated aromatic hydrocarbon at a temperature between 100° and 250° C.

8. In a method of making a diarylamine and the corresponding amino-diaryl, the step which consists in reacting a metallic anilide of the formula $C_6H_5$.NH.Met, wherein Met represents Na, K, Ca, Mg or Al, with a monohalogenated benzene at a temperature between 100° and 250° C.

9. In a method of making diphenylamine and amino-diphenyl conjointly, the step which consists in reacting sodium anilide with chlorobenzene at a temperature between 100° and 250° C.

Signed by us this 11 day of January, 1929.

EDGAR C. BRITTON.
HAROLD R. SLAGH.